United States Patent
Lee et al.

(10) Patent No.: US 10,551,700 B2
(45) Date of Patent: Feb. 4, 2020

(54) DISPLAY APPARATUS INCLUDING A BACKLIGHT ASSEMBLY

(71) Applicant: SAMSUNG DISPLAY CO., LTD., Yongin-si, Gyeonggi-Do (KR)

(72) Inventors: Myeong-Eon Lee, Hwaseong-si (KR); Jeong-Mo Nam, Incheon (KR); Sangrock Yoon, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 40 days.

(21) Appl. No.: 15/855,235

(22) Filed: Dec. 27, 2017

(65) Prior Publication Data

US 2018/0356696 A1    Dec. 13, 2018

(30) Foreign Application Priority Data

Jun. 12, 2017   (KR) .......................... 10-2017-0073182

(51) Int. Cl.
*G02F 1/1362*       (2006.01)
*G02F 1/1368*       (2006.01)
(Continued)

(52) U.S. Cl.
CPC ...... *G02F 1/136204* (2013.01); *G02F 1/1339* (2013.01); *G02F 1/1368* (2013.01);
(Continued)

(58) Field of Classification Search
CPC ............. G02F 1/136204; G02F 1/1339; G02F 1/133308; G02F 2001/133314
See application file for complete search history.

(56) References Cited

U.S. PATENT DOCUMENTS

2008/0310091 A1*  12/2008  Im .................... G02F 1/13452
                                                    361/679.02
2009/0045752 A1*   2/2009  Azuma ............. G02F 1/133351
                                                       315/169.3
(Continued)

FOREIGN PATENT DOCUMENTS

KR    10-2012-0118372    10/2012
KR    10-2013-0036905     4/2013
(Continued)

*Primary Examiner* — Jia X Pan
(74) *Attorney, Agent, or Firm* — F. Chau & Associates, LLC

(57) ABSTRACT

A display apparatus includes first and second substrates, a first side sealing layer, a ground connecting part, a flexible film, a driving circuit substrate, and a backlight assembly. The first substrate includes sides extending in a first and a second direction. The second substrate is disposed opposite to the first substrate and is larger in the second direction. The second substrate includes a thin film transistor, a ground wiring and first to fourth side surfaces. The first side sealing layer is disposed on the fourth side surface. The ground connecting part is disposed on the second substrate and is electrically connected to the ground wiring and the first side sealing layer. The flexible film is connected to the second substrate. The driving circuit substrate is connected to the flexible film. The backlight assembly is disposed between the driving circuit substrate and the first substrate.

20 Claims, 7 Drawing Sheets

(51) Int. Cl.
  *G02F 1/1339* (2006.01)
  *G02F 1/1333* (2006.01)
  *G02F 1/1335* (2006.01)
(52) U.S. Cl.
  CPC .. *G02F 1/133308* (2013.01); *G02F 1/136286* (2013.01); *G02F 1/133514* (2013.01); *G02F 1/133528* (2013.01); *G02F 2001/133314* (2013.01)

(56) References Cited

U.S. PATENT DOCUMENTS

| | | | | |
|---|---|---|---|---|
| 2009/0195996 A1* | 8/2009 | Isono | ............... | H05K 9/0054 361/751 |
| 2010/0079692 A1* | 4/2010 | Hwang | ............... | G02F 1/1339 349/40 |
| 2010/0182524 A1* | 7/2010 | Nomura | ............... | G02F 1/133308 349/40 |
| 2011/0102719 A1* | 5/2011 | Kakehi | ............... | G02F 1/134363 349/122 |
| 2012/0327328 A1* | 12/2012 | Kim | ............... | G02F 1/133308 349/59 |
| 2013/0050626 A1* | 2/2013 | Miyanaga | ............... | G02F 1/1345 349/139 |
| 2014/0293187 A1* | 10/2014 | Nam | ............... | G02F 1/13362 349/62 |
| 2015/0237746 A1 | 8/2015 | Lee et al. | | |
| 2015/0331178 A1* | 11/2015 | Choi | ............... | G02B 6/0083 362/611 |
| 2016/0018707 A1* | 1/2016 | Kang | ............... | G02F 1/133512 349/43 |
| 2016/0327841 A1* | 11/2016 | Jia | ............... | G02F 1/1345 |
| 2016/0349567 A1* | 12/2016 | Kwon | ............... | G02F 1/133308 |

FOREIGN PATENT DOCUMENTS

| | | |
|---|---|---|
| KR | 10-2015-0033158 | 4/2015 |
| KR | 10-2016-0141058 | 12/2016 |
| KR | 10-2017-0005254 | 1/2017 |

* cited by examiner

DISPLAY APPARATUS INCLUDING A BACKLIGHT ASSEMBLY

CROSS-REFERENCE TO RELATED APPLICATION

This application claims priority under 35 U.S.C. § 119 to Korean Patent Application No. 10-2017-0073182, filed on Jun. 12, 2017 in the Korean Intellectual Property Office, the disclosure of which is incorporated by reference herein in its entirety.

TECHNICAL FIELD

Exemplary embodiments of the present inventive concept relate to a display apparatus, and more particularly to, a display apparatus including a backlight assembly and a slim bezel.

DISCUSSION OF RELATED ART

A display apparatus having light-weight and compact characteristics has been manufactured. A cathode ray tube (CRT) display apparatus may be used due to a competitive price. However, the CRT display apparatus might not be easily portable. Therefore, a display apparatus such as a plasma display apparatus, a liquid crystal display apparatus and an organic light-emitting display apparatus may be used due to their small size, light weight, and low power consumption.

The liquid crystal display apparatus applies a voltage to liquid crystal molecules to change their molecular arrangement. The liquid crystal display apparatus displays an image by changing the molecular arrangement of a liquid crystal cell.

The display apparatus, such as the liquid crystal display apparatus, the plasma display apparatus, and the organic light-emitting display apparatus, has a display area for displaying an image and a peripheral area surrounding the display area. The peripheral area is a non-display area and a bezel surrounds the peripheral area. A driver for driving the display apparatus and/or elements for connection with the driver are disposed in the bezel. However, this may increase the size of the peripheral region. In addition, components of the driver may be damaged by static electricity due to their proximity to the outside.

SUMMARY

One or more exemplary embodiments of the present inventive concept provide a display apparatus, and more particularly, a display apparatus having a relatively slim bezel. A display apparatus according to an exemplary embodiment of the present inventive concept may reduce or prevent damage to a driver by external static electricity.

One or more exemplary embodiments of the present inventive concept provide a display apparatus. The display apparatus includes a first substrate, a second substrate, a first side sealing layer, a ground connecting part, a flexible film, a driving circuit substrate, and a backlight assembly. The first substrate has sides extending in a first direction and a second direction. The second direction is substantially perpendicular to the first direction. The second substrate is disposed opposite to the first substrate. The second substrate includes a thin film transistor and a ground wiring. The second substrate further includes a first side surface extending in the second direction, a second side surface opposite to the first side surface, a third side surface connected to the first side surface and the second side surface and extending in the first direction, and a fourth side surface opposite to the third side surface. The first side sealing layer is disposed on and extends along the fourth side surface of the second substrate. The ground connecting part is disposed on the second substrate, and is electrically connected to the ground wiring and the first side sealing layer. The flexible film is connected to the second substrate. The driving circuit substrate is connected to the flexible film. The backlight assembly is disposed between the driving circuit substrate and the first substrate.

The backlight assembly may include a light source and a cover. The light source may be configured to provide light to a display panel comprising the first substrate and the second substrate. The case may include a metal.

The driving circuit substrate may include a ground part. The ground part may be electrically connected to the ground wiring through the flexible film. The ground part may be grounded to the case of the backlight assembly.

The ground part may be connected to the backlight assembly through a ground pin passing through the driving circuit substrate.

The display apparatus may further include a cover part. The cover part may be configured to cover the driving circuit substrate. The cover part may include a bottom portion, a step portion, and a sidewall. The bottom portion may be disposed in parallel with the display panel. The step portion may form a step with the bottom portion, and may be coupled with the backlight assembly. The sidewall may be substantially perpendicular to the bottom portion. The driving circuit substrate may be disposed between the backlight assembly and the cover part.

The sidewall may be spaced apart from the second substrate in a third direction. The third direction may be substantially perpendicular to the first and second directions.

The display apparatus may further include a liquid crystal layer and a sealing member. The liquid crystal layer may be disposed between the second substrate and the first substrate. The sealing member may be disposed between the second substrate and the first substrate to seal the liquid crystal layer. The ground connecting part may contact the sealing member.

The first side sealing layer may include conductive particles. The first side sealing layer may also include a polymeric material including a black pigment.

The display apparatus may further include a second side sealing layer. The second side sealing layer may be disposed on the first side surface, the second side surface and the third side surface of the second substrate. The second side sealing layer may cover the first side surface, the second side surface, and the third side surface of the second substrate.

The second side sealing layer may include an insulation material.

The ground connecting part may be a silver (Ag) dot.

The display apparatus may further include a ground connecting layer. The ground connecting layer may be disposed on a side surface of the first substrate and connected to the ground connecting part.

The ground connection layer may include substantially the same material as the ground connecting part.

The second substrate may include an upper base substrate and a metal pattern. The metal pattern may be disposed on the upper base substrate. The metal pattern may include the ground wiring.

The first substrate may include a lower base substrate and a transparent conductive layer. The transparent conductive layer may be disposed between the lower base substrate and the backlight assembly. The transparent conductive layer may be electrically connected to the ground connecting part.

A portion of the second substrate might not be covered by the first substrate. The flexible film may be connected to the exposed portion of the second substrate.

The first side sealing layer may include a conductive material on the fourth side surface of the second substrate.

The first side sealing layer may include a sealing layer including an insulation material and a conductive layer contacting the sealing layer.

The second substrate may further include a signal wiring electrically connected to the thin film transistor. The flexible film may include a first connecting terminal and a second connecting terminal. The ground wiring may be electrically connected to the first connecting terminal. The second connecting terminal may be electrically connected to the signal wiring.

One or more exemplary embodiments of the present inventive concept provide a display apparatus. The display apparatus may include a display panel, a side sealing layer, a ground connecting part, a backlight assembly, a flexible film, and a driving chip. The display panel includes a lower substrate, an upper substrate, and a liquid crystal layer. The upper substrate is disposed opposite to the lower substrate. The liquid crystal layer is disposed between the lower substrate and the upper substrate. The first side sealing layer is disposed on a side surface of the upper substrate. The side sealing layer is conductive. The ground connecting part is disposed on a lower surface of the upper substrate. The ground connecting part is electrically connected to the ground wiring and the side sealing layer. The backlight assembly is disposed under the display panel. The flexible film is electrically connected to the ground wiring. The driving chip is disposed on the flexible film.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EMBODIMENTS

Hereinafter, exemplary embodiments of the present inventive concept will be described in more detail below with reference to the accompanying drawings.

Figure 1:
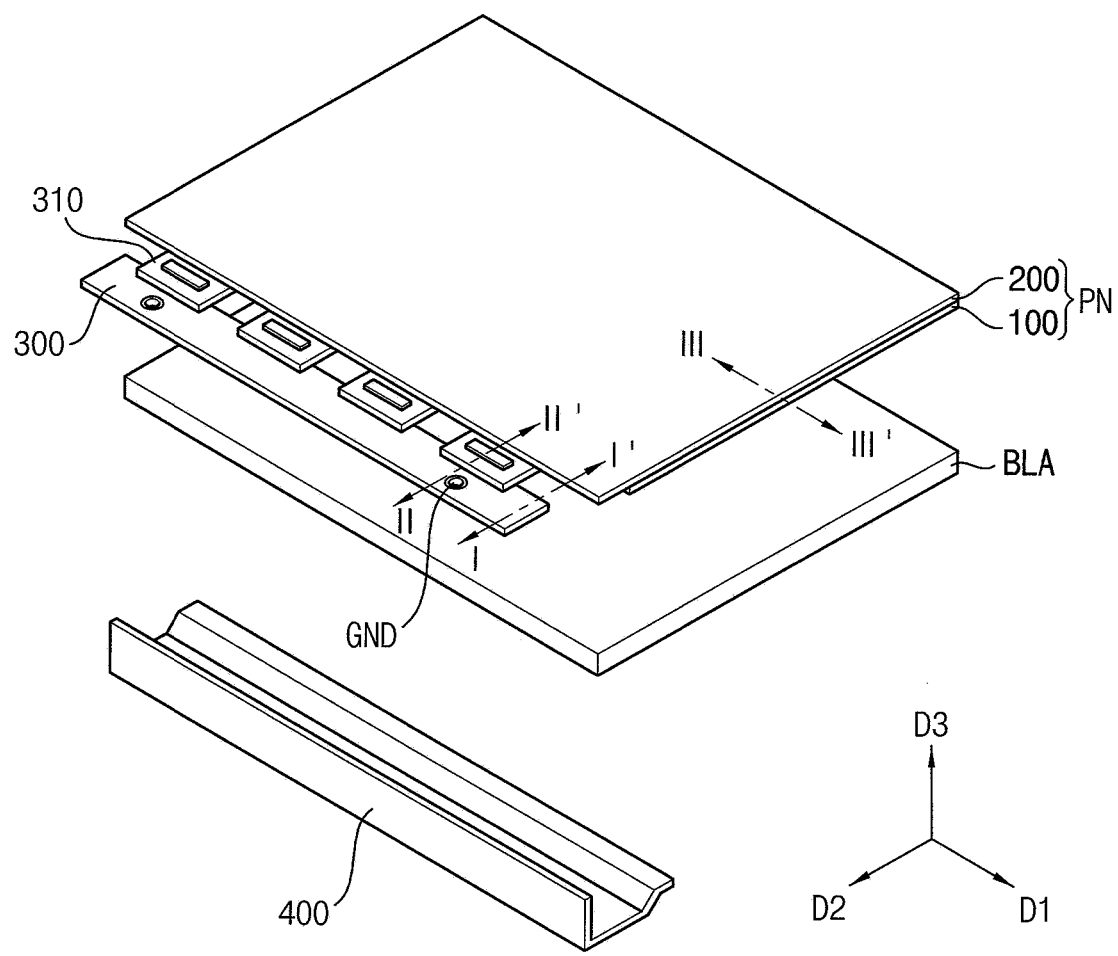
FIG. 1 is an exploded perspective view illustrating a display apparatus according to an exemplary embodiment of the present inventive concept.
Figure 2:
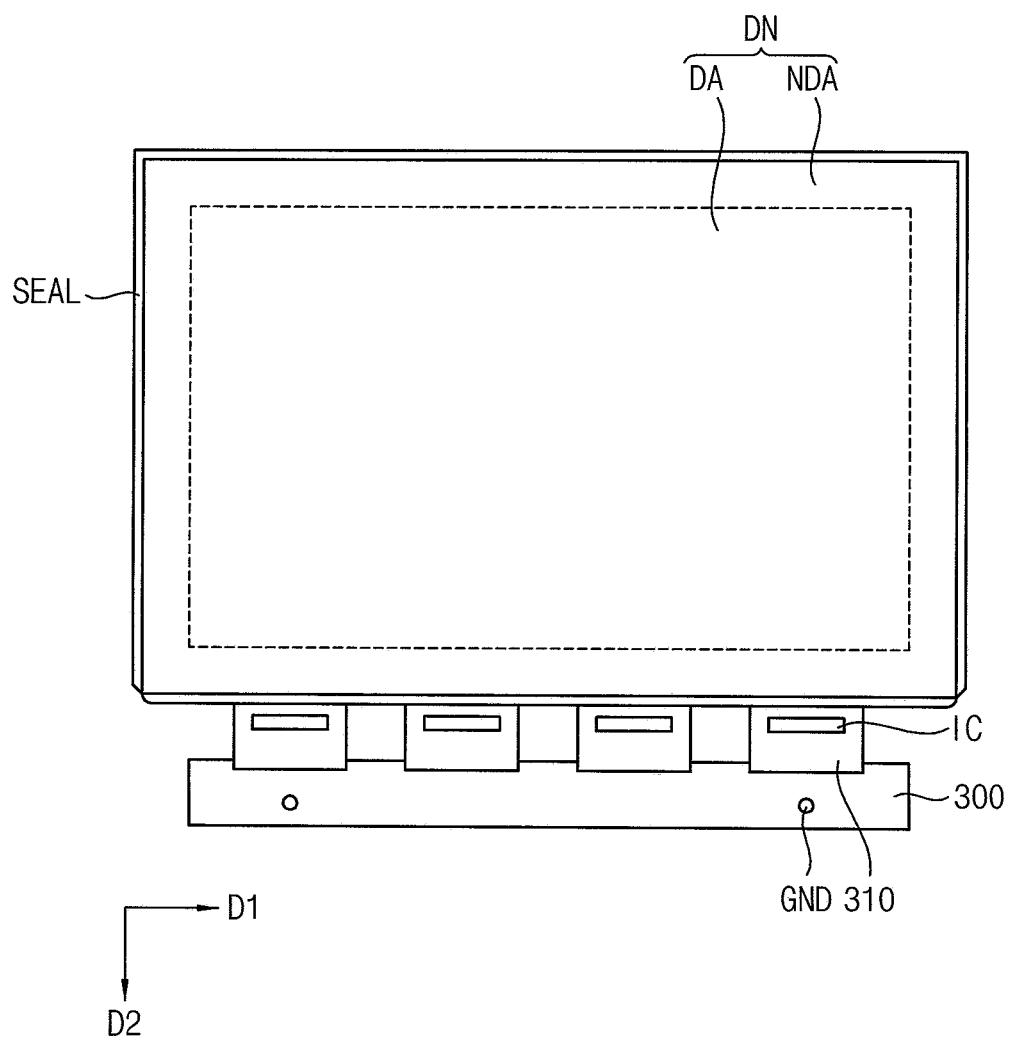
FIG. 2 is a plan view illustrating a display panel and a driving circuit substrate of a display apparatus of FIG. 1 according to an exemplary embodiment of the present inventive concept.
Figure 3:
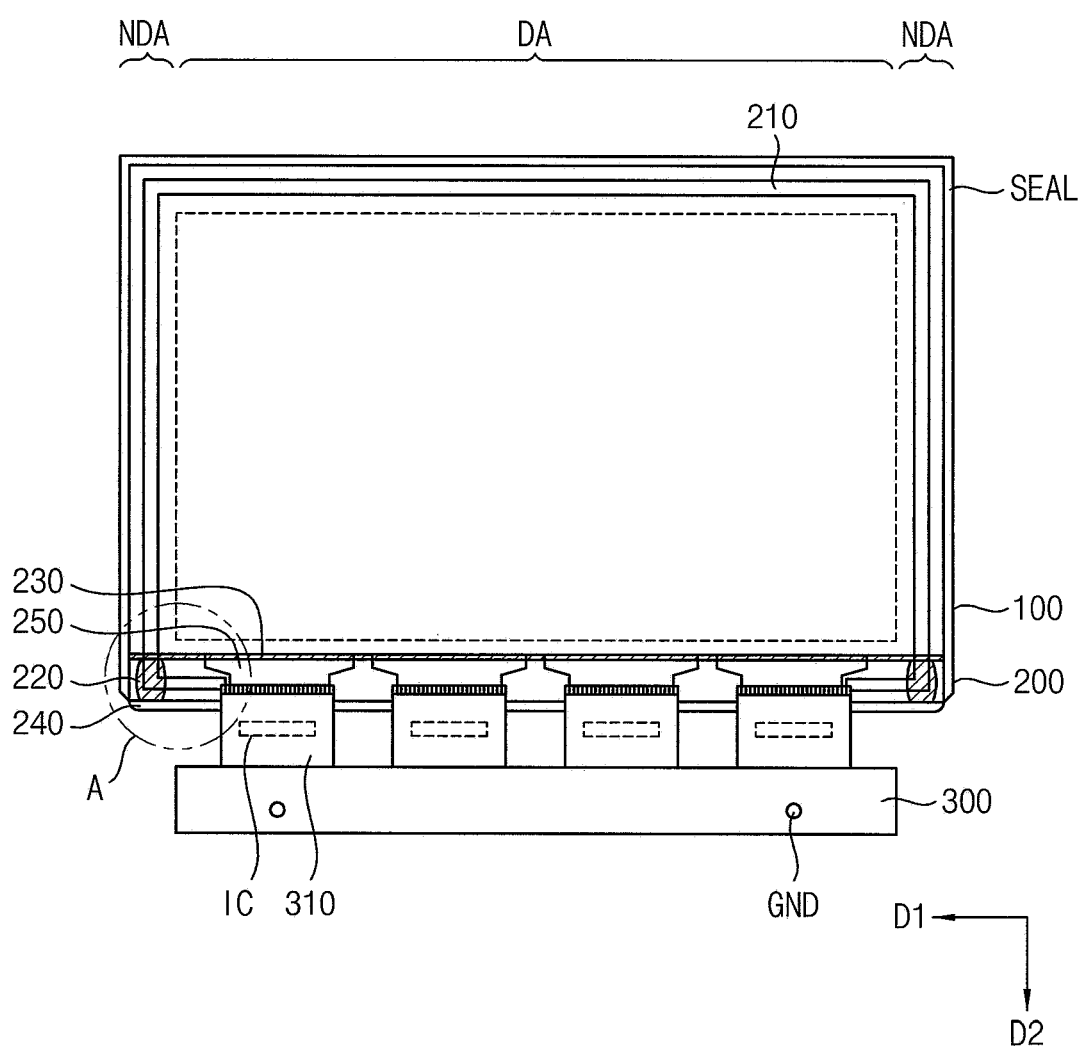
FIG. 3 is a bottom view illustrating a display panel and a driving circuit substrate of a display apparatus of FIG. 1 according to an exemplary embodiment of the present inventive concept.

FIG. 1 is an exploded perspective view illustrating a display apparatus according to an exemplary embodiment of the present inventive concept. FIG. 2 is a plan view illustrating a display panel and a driving circuit substrate of a display apparatus of FIG. 1 according to an exemplary embodiment of the present inventive concept. FIG. 3 is a bottom view illustrating a display panel and a driving circuit substrate of a display apparatus of FIG. 1 according to an exemplary embodiment of the present inventive concept.

Referring to FIGS. 1 to 3, the display apparatus may include a display panel PN, a flexible film 310, a driving circuit substrate 300, a backlight assembly BLA, and a cover part 400. The display panel PN may include a lower substrate 100 and an upper substrate 200.

The driving circuit substrate 300 may include a ground part GND.

Figure 5A:
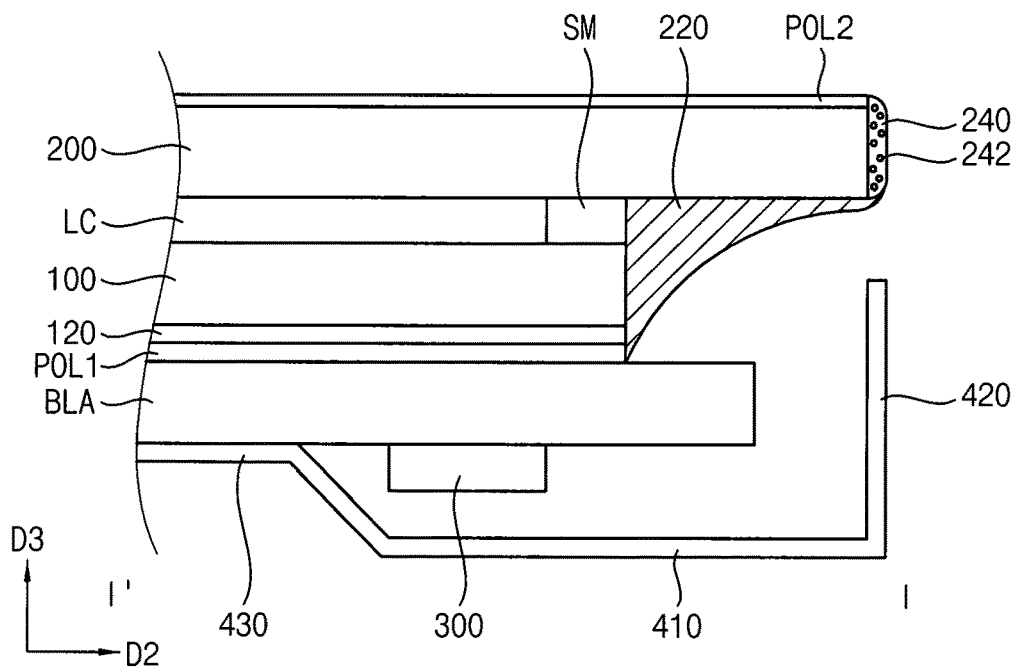
FIG. 5A is a cross-sectional view taken along a line I-I' of FIG. 1 according to an exemplary embodiment of the present inventive concept.

The display panel PN may include the lower substrate 100, the upper substrate 200 and a liquid crystal layer LC of FIG. 5A. The liquid crystal layer LC of FIG. 5A may be disposed between the lower substrate 100 and the upper substrate 200. The structures of the lower substrate 100, the upper substrate 200, and the liquid crystal layer LC will be described in more detail below with reference to FIGS. 5A to 5C.

In a plan view, the display panel PN may include a display area DA and a non-display area NDA. The display area DA may display an image. The non-display area NDA may surround the display area DA. An image might not be displayed in the non-display area NDA. An image may be displayed, for example, on a plane defined by a first direction D1 and a second direction D2 in the display area DA. The second direction D2 may be substantially perpendicular to the first direction D1. A plurality of driving circuits, such as an amorphous silicon gate (ASG) circuit, may be formed in the non-display area NDA of the display panel PN. The plurality of driving circuits may drive the display apparatus.

Referring to FIG. 3, the upper substrate 200 may include a ground wiring 210, a ground connecting part 220, a ground connecting layer 230, and a signal wiring portion 250. The upper substrate 200 may include a first side surface, a second side surface, a third side surface, and a fourth side surface. The first side surface may extend in the second direction D2. The second side surface may be positioned opposite to the first side surface. The third side surface may be connected to each of the first and second side surfaces. The third side surface may extend in the first direction D1. The fourth side surface may be positioned opposite to the third side surface. Thus, the first side surface may be a left side surface of the upper substrate 200, the second side surface may be a right side surface of the upper substrate 200, the third side surface may be an upper side surface of the upper substrate 200, and the fourth side surface may be a lower side surface of the upper substrate 200; however, exemplary embodiments of the present inventive concept are not limited thereto.

The ground wiring 210 may be formed in the non-display area NDA of the display panel PN. The ground wiring 210 may extend along the non-display area NDA. A portion of the ground wiring 210 might not be covered by the upper substrate 200. Thus, a portion of the ground wiring 210 may be exposed. The exposed portion of the ground wiring 210 may be connected to the ground connecting part 220. The ground wiring 210 may also be formed in the display area DA of the display panel PN. The ground connecting part 220 may be formed at each end of the upper substrate 200 in the first direction D1 For example, the ground connection part 220 may be formed at each end of the upper substrate 200 on the fourth side surface of the upper substrate 200. The exposed portion of the ground wiring 210 may be connected to a connecting terminal portion of the flexible film 310. Accordingly, the ground wiring 210 may be electrically connected to the ground connecting part 220.

Figure 5B:
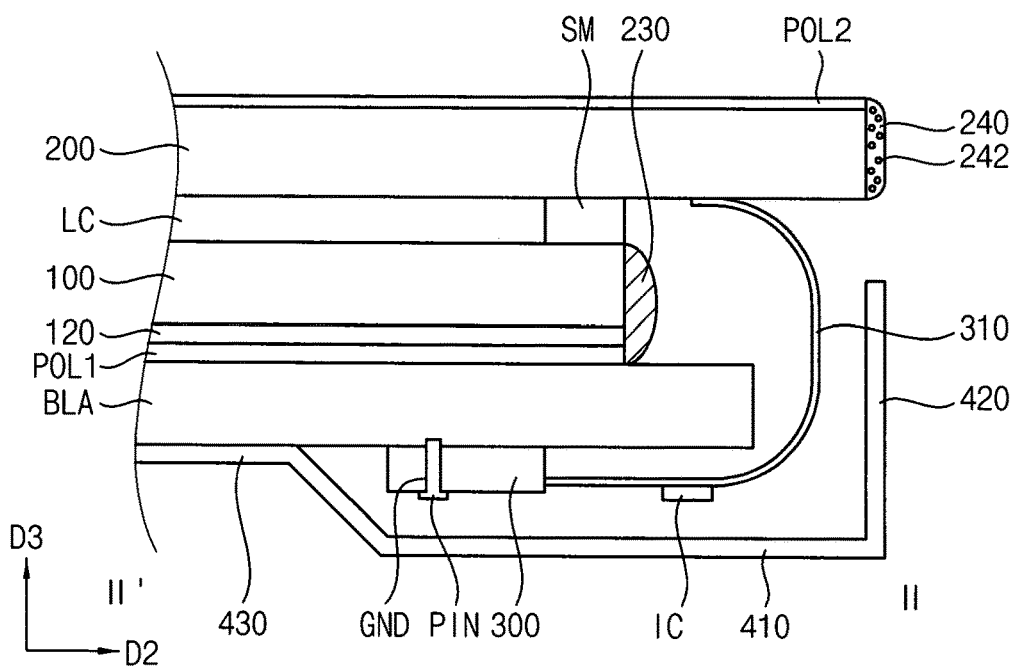
FIG. 5B is a cross-sectional view taken along a line II-II' of FIG. 1 according to an exemplary embodiment of the present inventive concept.
Figure 5C:
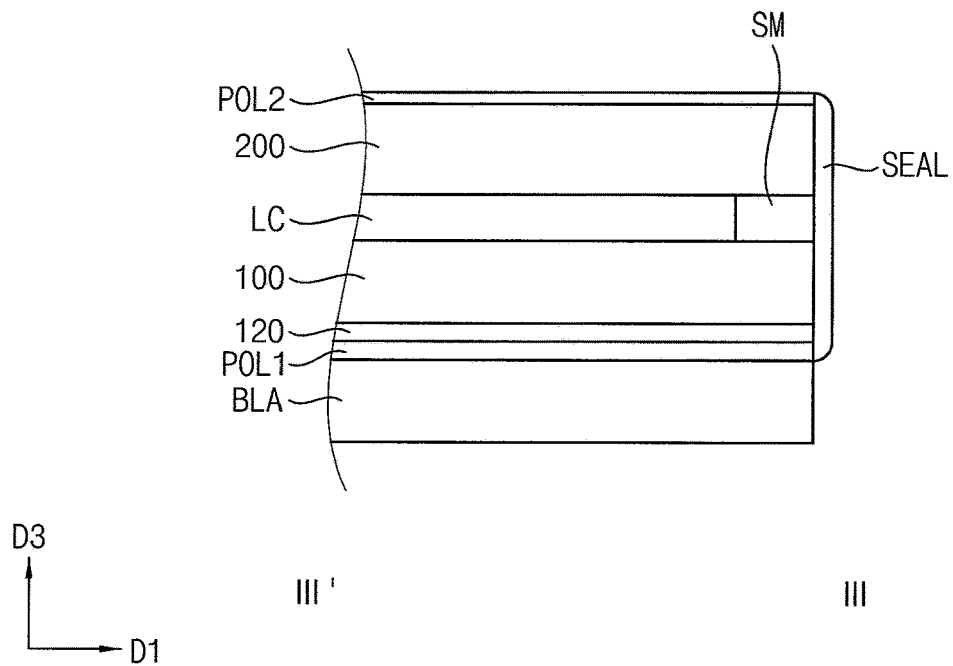
FIG. 5C is a cross-sectional view taken along a line III-III' of FIG. 1 according to an exemplary embodiment of the present inventive concept.

The lower substrate 100 may be disposed opposite to the upper substrate 200. The liquid crystal layer LC may be disposed between the upper substrate 200 and the lower substrate 100 as illustrated in FIG. 5C. The lower substrate 100 may be smaller than the upper substrate 200 in the second direction D2. Accordingly, a length of the lower substrate 100 may be smaller than a length of the upper substrate 200. Thus, the upper substrate 200 may be larger than the lower substrate 100 in the second direction D2. A portion of the lower surface of the upper substrate 200 might not be covered by the lower substrate 100 at a lower edge of the display panel PN. Thus, a portion of the lower surface of the upper substrate 200 may be exposed. On the side surface of the lower substrate 100, the ground connection layer 230 may be formed along the first direction D1, for example, to be connected to the ground connecting part 220.

The display panel PN may include a first side sealing layer 240 and a second side sealing layer SEAL.

The first side sealing layer 240 may be disposed on a side surface of an end of the upper substrate 200 in the second direction D2. Thus, the first side sealing layer 240 may be disposed on the fourth side surface. The first side sealing layer 240 may include a light-blocking material. The light-blocking material may reduce or prevent light leakage through a side surface of the display panel PN. For example, the first side sealing layer 240 may include a polymeric material to which a black pigment may be added.

The first side sealing layer 240 may have conductive properties. For example, the first sealing layer 240 may include a plurality of conductive particles.

The second side sealing layer SEAL may be disposed on side surfaces of the display panel PN in which the first sealing layer 240 is not formed. Thus, the second side sealing layer SEAL may be disposed on an upper side surface of the display panel PN, for example, the third side surface. The second side sealing member SEAL may also be disposed on the first side surface and the second side surfaces, for example, left and right side surfaces, of the display panel PN. The second side sealing layer SEAL, may be formed on a side surface of the upper substrate 200 and on a side surface of the lower substrate 100. The second side sealing layer SEAL may include a light-blocking material. The light-blocking material may reduce or prevent light leakage through side surfaces of the display panel PN. For example, the second side sealing layer SEAL may include a polymeric material to which a black pigment may be added.

The flexible film 310 may be connected to the upper substrate 200 of the display panel PN. For example, the flexible film 310 may be disposed below the upper substrate 200 of the display panel PN. The driving circuit substrate 300 may provide a driving signal to the display panel PN, for example, through the flexible film 310. The driving signal may drive the display apparatus.

A driving chip integrated circuit (IC) may be disposed on the flexible film 310. The driving chip IC may drive the display apparatus. The driving chip IC may be electrically connected to a data line of the display panel PN. For example, the driving chip IC may be a data driving IC mounted on the flexible film 310 and electrically connected to a data line of the display panel PN.

The driving circuit substrate 300 may be connected to the flexible film 310. The driving circuit substrate 300 may include a driving circuit, for example, for driving the display apparatus. The driving circuit may generate a driving signal, which may be provided to the display panel PN, for example, through the flexible film 310.

The driving circuit substrate 300 may include the ground part GND. The ground part GND may be electrically connected to a surface of the backlight assembly BLA. The ground part GND may be grounded on a lower surface of the backlight assembly BLA. The lower surface of the backlight assembly BLA may include a metal. For example, the ground part GND may be electrically connected to the lower surface of the backlight assembly BLA through a around pin PIN of FIG. 5B.

The driving circuit substrate 300 may be disposed between the backlight assembly BLA and the cover part 400. Accordingly, a space between the cover part 400 and the lower surface of the backlight assembly BLA may be configured to receive the driving circuit substrate 300. Thus, the driving circuit substrate 300 may be disposed in a space between the cover part 400 and the lower surface of the backlight assembly BLA.

The backlight assembly BLA may include a light source, for example, for supplying light to the display panel PN. The backlight assembly BLA may include a case. The case included in the backlight assembly BLA may include a metal. Thus, the lower surface of the backlight assembly BLA may include a metal.

The cover part 400 may be disposed on the lower surface of the backlight assembly BLA. Thus, the cover part 400 may at least partially cover the driving circuit substrate 300 and the flexible film 310. The cover part 400 may form a space between the backlight assembly BLA and the cover part 400, for example, to house the driving circuit substrate 300.

According to an exemplary embodiment of the present inventive concept, the respective components may be coupled to each other, for example, by using an adhesive such as a bolt or double-sided tape. For example, the display panel PN and the backlight assembly BLA may be coupled together by attaching double-sided tape between the display panel PN and the backlight assembly BLA in the non-display area NDA of the display panel PN. The cover part 400 may be coupled to the lower surface of the backlight assembly BLA, for example, by using bolts.

Figure 4:
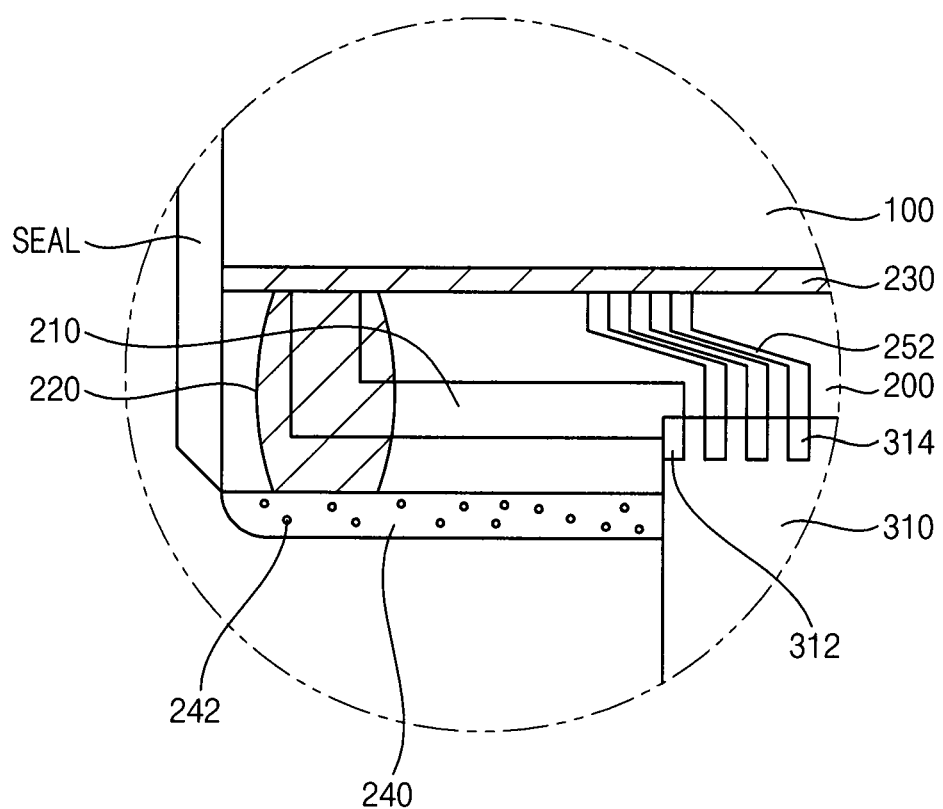
FIG. 4 is an enlarged view of a portion A of FIG. 3 according to an exemplary embodiment of the present inventive concept.

FIG. 4 is an enlarged view of a portion A in FIG. 3 according to an exemplary embodiment of the present inventive concept.

Referring to FIG. 4 and FIGS. 1 to 3, the ground wiring 210, the signal wiring portion 250, and the ground connecting part 220 may be disposed on the exposed portion of the lower surface of the upper substrate 200.

Since the upper substrate 200 may be larger than the lower substrate 100 in the second direction D2, a portion of the lower surface of the upper substrate 200 may be covered by the lower substrate 100 at a lower edge of the display panel PN. Thus, a portion of the lower surface of the upper substrate 200 may be exposed. A portion of the ground wiring 210 and a portion of the plurality of signal wirings 252 of the signal wiring portion 250 may be exposed on the lower surface of the exposed portion of the upper substrate 200.

The signal wiring portion 250 may include a plurality of signal wirings 252. The plurality of signal wirings 252 may be wirings for transmitting a signal for driving the display apparatus. For example, the plurality of signal wirings 252 may be electrically connected to a data line or a gate line of a pixel of the display apparatus. The signal line 252 may be connected to a second connecting terminal 314 of the flexible film 310. The second connecting terminal 314 may be electrically connected to the driving chip IC of FIG. 2.

The flexible film 310 may include a connecting terminal portion. The connecting terminal portion may include a plurality of connecting terminals. The plurality of connecting terminals may include a first connecting terminal 312 and a second connecting terminal 314. The first connecting terminal 312 may be electrically connected to the ground wiring 210. The second connecting terminal 314 may be electrically connected to the signal line 252.

The ground connecting part 220 may be electrically connected to each of the ground wiring 210, the first sealing layer 240, and the ground connecting layer 230. The ground connecting part 220 may be formed at each end of the upper substrate 200 in the first direction D1. The ground connecting part 220 may be a silver (Ag) dot formed, for example, by providing silver on the upper substrate 200 on which the ground wiring 210 is formed.

The first sealing layer 240 may include a plurality of conductive particles 242. The first sealing layer 240 may be connected to the ground connecting part 220.

The ground connecting layer 230 may be disposed on the side surface of the lower substrate 100 adjacent to the first sealing layer 240 and connected to the ground connecting part 220. The ground connecting layer 230 may include substantially the same material as the ground connecting part 220. For example, the ground connecting layer 230 may include silver (Ag).

FIG. 5A is a cross-sectional view taken along a line of FIG. 1 according to an exemplary embodiment of the present inventive concept. FIG. 5B is a cross-sectional view taken along a line II-II' of FIG. 1 according to an exemplary embodiment of the present inventive concept. FIG. 5C is a cross-sectional view taken along a line III-III' of FIG. 1 according to an exemplary embodiment of the present inventive concept.

Referring to FIGS. 5A to 5C and FIGS. 1 to 4, the display apparatus may include a display panel PN, a lower polarizer POL1, a transparent conductive layer 120, an upper polarizer POL2, a first side sealing layer 240, a ground connecting part 220, a backlight assembly BLA, a driving circuit substrate 300, a flexible film 310, and a cover part 400. The display panel PN may include a lower substrate 100, an upper substrate 200, a liquid crystal layer LC, and a sealing member SM.

The lower substrate 100 may include a lower base substrate and a color filter. The color filter may be disposed on the lower base substrate. The lower base substrate may include a transparent insulating substrate. For example, the lower base substrate may include a glass substrate, a quartz substrate, a transparent resin substrate, or the like. The transparent resin substrate may be a polyimide-based resin, an acryl-based resin, a polyacrylate-based resin, a polycarbonate-based resin, a polyether-A polyether-based resin, a sulfonic acid-based resin, a polyethyleneterephthalate-based resin, or the like.

The color filter may provide a color to light transmitted through the liquid crystal layer LC. The color filter may be a red color filter for providing a red light, a green color filter for providing a green light, or a blue color filter for providing a blue light. The color filter may be arranged to correspond to the pixel. The color filter may be arranged to have different colors between adjacent pixels. For example, the color filter may be a red color filter for providing a red light corresponding to a pixel, and a green color filter for providing a green light corresponding to a pixel next to the pixel provided with the red light.

The color filter 210 may provide a color to light transmitted through the liquid crystal layer LC. The color filter 210 may be a red color filter for providing a red light, a green color filter for providing a green light, or a blue color filter for providing a blue light. The color filter 210 may be arranged to correspond to the pixel. The color filter 210 may be arranged to have different colors between adjacent pixels. For example, the color filter 210 may be a red color filter for providing a red light corresponding to a pixel, and a green color filter for providing a green light corresponding to a pixel next to the pixel provided with the red light.

The lower substrate 100 may include structures such as an over-coating layer, a common electrode, or the like.

The upper substrate 200 may include an upper base substrate and a thin film transistor layer. The thin film transistor layer may be disposed on the upper base substrate. The upper base substrate may include a transparent insulating substrate. For example, the upper base substrate may include a glass substrate, a quartz substrate, a transparent resin substrate, or the like. The thin film transistor layer may include a thin film transistor. The thin film transistor may include a gate electrode, an active pattern, a source electrode, and a drain electrode. The gate electrode or the source and drain electrodes may be included in the metal pattern layer. For example, the metal pattern layer may include a gate metal pattern layer and a data metal pattern layer. The gate metal pattern layer may include the gate electrode and the ground wiring 210. The data metal pattern layer may include the source and drain electrodes.

The upper substrate 200 may include a gate line, a data line, a pixel electrode, an insulating layer, or the like.

The liquid crystal layer LC may be disposed between the upper substrate 200 and the lower substrate 100. The liquid crystal layer LC may include a plurality of liquid crystal molecules. The plurality of liquid crystal molecules may have optical anisotropy. The plurality of liquid crystal molecules may be driven by an electric field, for example, to transmit or at least partially block light passing through the liquid crystal layer LC. Thus, an image may be displayed.

The sealing member SM may be disposed between the upper substrate 200 and the lower substrate 100. The sealing member SM may at least partially seal the liquid crystal layer LC. For example, the sealing member SM may entirely seal the liquid crystal layer LC.

The transparent conductive layer 120 may be formed on the lower base substrate 100. The transparent conductive layer 120 may include a transparent conductive material such as indium tin oxide (ITO), indium zinc oxide (IZO), or the like. The transparent conductive layer 120 may be in contact with the ground connecting part 220 or the ground connecting layer 230.

The lower polarizer POL1 may be disposed between the transparent conductive layer 120 and the backlight assembly BLA. The lower polarizer POL1 may be an absorption-type polarizing plate such as a general polyvinyl alcohol (PVA) polarizing plate or a reflection-type polarizing plate such as a wire grid polarizer. A position of the lower polarizer POL1 may be changed to any position between the liquid crystal layer LC and the backlight assembly BLA.

An upper polarizer POL2 may be disposed on the upper substrate 200. The upper polarizer POL2 may be disposed on the upper base substrate of the upper substrate 200. The upper polarizer POL2 may be an absorption-type polarizing plate such as a polyvinyl alcohol (PVA) polarizing plate or a reflection-type polarizing plate such as a wire grid polarizer. Alternatively, the upper polarizer POL2 may disposed on a lower side of the upper base substrate.

The second side sealing layer SEAL may be disposed on side surfaces of the display panel PN where the first sealing layer 240 is not formed. Thus, the second side sealing layer SEAL may be formed on side surfaces of the upper and lower substrates 200 and 100, a side surface of the sealing member SM, and a side surface of the transparent conductive layer 120.

The first side sealing layer 240 may be formed on a side surface of the upper substrate 200. The ground connecting part 220 may be disposed on the ground wiring 210 on a lower surface of the upper substrate 200, a side surface of the sealing member SM, a side surface of the lower substrate 100, and a side surface of the transparent conductive layer 120. The ground connecting part 220 may electrically connect the sealing layer 240, the transparent conductive layer 120, and the ground wiring 210 to each other.

The ground connecting layer 230 may be disposed on the lower substrate 100 and the transparent conductive layer 120. The ground connecting layer 230 may be disposed on a side surface of the lower substrate 100 and on a side surface of the transparent conductive layer 120. The ground connecting layer 230 may be connected to the ground connecting part 220.

The backlight assembly BLA may be disposed below the lower polarizer POL1. The driving circuit substrate 300 may be positioned on a lower surface of the backlight assembly BLA. The lower surface of the backlight assembly BLA may include a metal. The lower surface of the backlight assembly BLA may be used as an earth.

According to an alternative embodiment of the present inventive concept, referring to FIGS. 5A and 5B, the backlight assembly may be disposed below the upper substrate 200 and the lower substrate 100. A length of the backlight assembly BLA may be greater than a length of the lower substrate 100 in the second direction D2. The length of the backlight assembly BLA may be less than a the length of the upper substrate 100 in the second direction D2. Additionally, the lower polarizer POL1 may have substantially a same length as the lower substrate 100 and the transparent conductive layer 120. A combined length of the liquid crystal layer and the sealing member SM may be substantially the same as the length of the lower substrate 100.

The cover part 400 may include a lower portion 410, a step portion 430, and a side wall 420. The lower portion 410 may be disposed in parallel with the display panel PN. The step portion 430 may form a step with the lower portion 410. The step portion 430 may be coupled to the backlight assembly BLA. The side wall 420 may be substantially perpendicular to the lower portion 410. Accordingly, the driving circuit substrate 300 may be disposed between the backlight assembly BLA and the cover part 400. The side wall 420 may be spaced apart from the upper substrate 200 in a third direction D3. The third direction D3 may be substantially perpendicular to the first and second directions D1 and D2.

The driving circuit substrate 300 may be disposed on the lower surface of the backlight assembly BLA. The driving circuit substrate 300 may be connected to the upper substrate 200 of the display panel PN, for example, by the flexible film 310. A driving chip IC may be disposed on the flexible film 310. The driving circuit substrate 300 may include a ground part GND. The ground part GND may be connected to the backlight assembly BLA, for example, by a ground pin PIN. The ground wiring 210 of the upper substrate 200 may be electrically connected to the ground part GND of the driving circuit substrate 300, for example, through the first connecting terminal 312 of the flexible film 310. The ground wiring 210 of the upper substrate 200 may be grounded to the backlight assembly BLA, for example, via the ground pin PIN.

According to an exemplary embodiment of the present inventive concept, when an external static electricity is applied to the lower polarizer POL1 which disposed on a frontal portion of the display apparatus, the static electricity may flow to the first side sealing layer 240 which is a nearby conductor. The static electricity is grounded to the backlight assembly BLA, for example, through each of the first side sealing layer 240, the ground wiring 210, the first connection terminal 312 of the flexible film 310, and the ground part GND of the driving circuit substrate 300. Alternatively, the static electricity may flow to the transparent conductive layer 120, for example, through the first side sealing layer 240 and the ground connecting part 220.

Thus, static electricity applied from the outside can be reduced or prevented, and therefore damage to the circuit of the display apparatus can be reduced or prevented. Furthermore, static electricity may be reduced or prevented from flowing into and damaging the driving chip IC.

Figure 6:
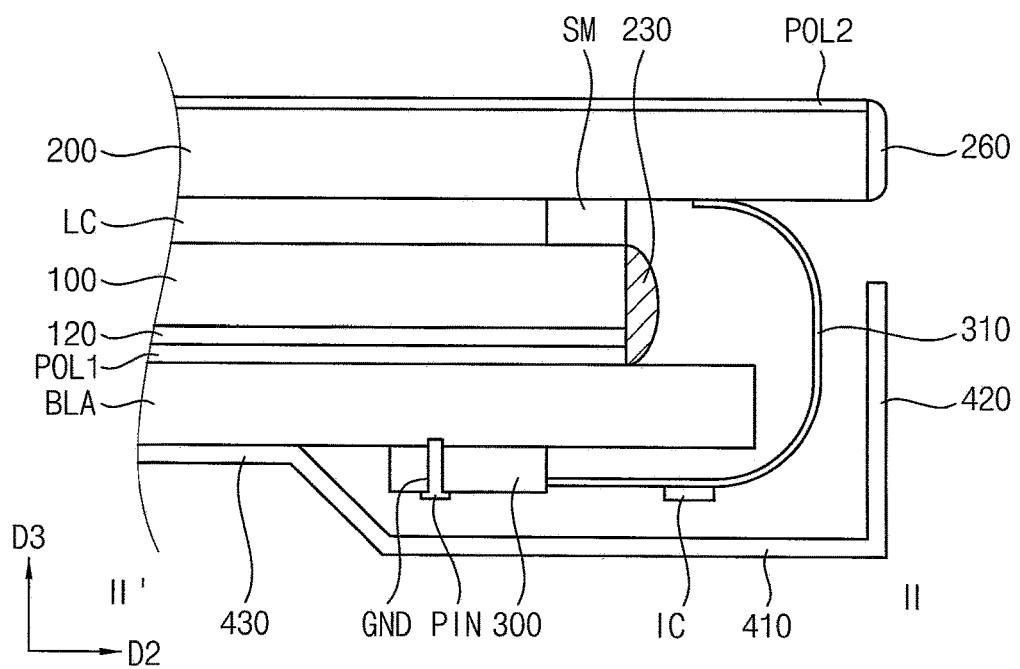
FIG. 6 is a cross-sectional view illustrating a display apparatus according to an exemplary embodiment of the present inventive concept.

FIG. 6 is a cross-sectional view illustrating a display apparatus according to an exemplary embodiment of the present inventive concept.

Referring to FIG. 6, the display apparatus may be substantially the same as the display apparatus described with reference to FIG. 1; however, the first side sealing layer 260 may differ as described in more detail below. Therefore, repetitive descriptions thereof may be omitted.

The display apparatus may include an upper polarizer POL2, an upper substrate 200, a liquid crystal layer LC, a sealing member SM, a lower substrate 100, a transparent conductive layer 120, a lower polarizer POL1, a driving circuit substrate 300, a flexible film 310, a driving chip IC, cover parts 410, 420 and 430, a ground connecting layer 230, a ground connecting part 220, a ground wiring 210, and a first side sealing layer 260.

The first side sealing layer 260 may be disposed on a side surface of the upper substrate 200. For example, the first side sealing layer 260 may be disposed at an end of the upper substrate 200 in the second direction D2. The first side sealing layer 260 may include a conductive material. For example, the first side sealing layer 260 may be formed by coating the conductive material such as a metal on the side surface of the upper substrate 200.

Figure 7:
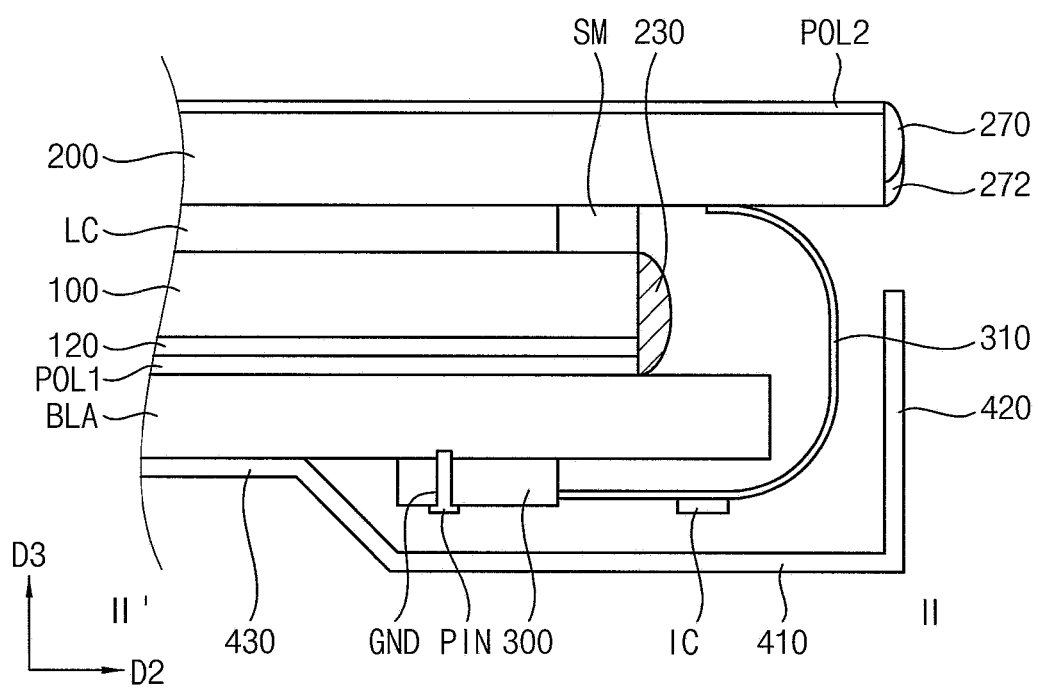
FIG. 7 is a cross-sectional view illustrating a display apparatus according to an exemplary embodiment of the present inventive concept.

FIG. 7 is a cross-sectional view illustrating a display apparatus according to an exemplary embodiment of the present inventive concept.

Referring to FIG. 7, the display apparatus may be substantially the same as the display apparatus described with reference to FIG. 1; however, the display apparatus of FIG. 7 may include a sealing layer 270 and a conductive layer 272 as described in more detail below. Therefore, repeated descriptions thereof may be omitted.

The display apparatus may include an upper polarizer POL2, an upper substrate 200, a liquid crystal layer LC, a sealing member SM, a lower substrate 100, a transparent conductive layer 120, a lower polarizer POL1, a driving circuit substrate 300, a flexible film 310, a driving chip IC, cover parts 410, 420 and 430, a ground connecting layer 230, a ground connecting part 220, a ground wiring 210, a sealing layer 270, and a conductive layer 272.

The sealing layer 270 may include substantially the same material as the second side sealing layer SEAL of FIG. 2. For example, the sealing layer 270 may include a polymeric material to which a black pigment may be added. The conductive layer 272 may contact the sealing layer 270. For example, the conductive layer 272 may contact the sealing layer 270 on a side surface of the upper substrate 200. The conductive layer 272 may extend along the first direction D1 of FIG. 1 in parallel with the sealing layer 270. The conductive layer 272 may include a conductive material. The conductive layer 272 may be connected to the ground connecting part. The sealing layer 270 may be formed together with the second side sealing layer SEAL of FIG. 2. The conductive layer 272 may be formed separately. Accordingly, the display apparatus according to an exemplary embodiment of the present inventive concept may be manufactured.

According to an exemplary embodiment of the present inventive concept, a display apparatus may include a first side sealing layer, a ground connecting part, a flexible film, a driving circuit substrate, and a backlight assembly. When external static electricity is applied to a frontal portion of the display apparatus, the static electricity may flow to the first side sealing layer which is a nearby conductor. The static electricity may be grounded to the backlight assembly, for example, through each of the first side sealing layer, the ground wiring, the flexible film, and the driving circuit substrate. Accordingly, the static electricity applied from the outside can be reduced or prevented from damaging the circuit of the display apparatus. Additionally, the static electricity may be reduced or prevented from flowing into and damaging the driving chip disposed on the flexible film.

The foregoing is illustrative of exemplary embodiments of the present inventive concept and is not to be construed as limiting thereof. Although exemplary embodiments of the present inventive concept have been described herein, those skilled in the art will readily appreciate that modifications are possible in the exemplary embodiments without materially departing from the teachings of the inventive concept. Accordingly, all such modifications are intended to be included within the scope of the exemplary embodiments of the present inventive concept as defined in the following claims.

What is claimed is:

1. A display apparatus, comprising;
   a display area arid a non-display area;
   a first substrate having sides extended in a first direction and a second direction, the second direction substantially perpendicular to the first direction;
   a second substrate disposed opposite to the first substrate, the second substrate being larger than the first substrate in the second direction, the second substrate comprising a thin film transistor and a ground wiring, the second substrate further comprising a first side surface extending in the second direction, a second side surface opposite to the first side surface, a third side surface connected to the first side surface and the second side surface and extending in the first direction, and a fourth side surface opposite to the third side surface;
   a first side sealing layer directly disposed on and extending along the fourth side surface of the second substrate;
   a ground connecting part disposed on the second substrate and electrically connected to the ground wiring and the first side sealing layer;
   a flexible film connected to the second substrate;
   a driving circuit substrate connected to the flexible film; and a backlight assembly disposed between the driving circuit substrate and the first substrate,
   wherein a portion of the ground wiring is disposed in the non-display area and is at least partially covered by the ground connecting part in a plan view, and
   wherein a material composition of the first side sealing layer is different from a material composition of the ground connecting part.

2. The display apparatus of claim 1, wherein the backlight assembly comprises a light source configured to provide light to a display panel comprising the first and second substrates and a case including a metal.

3. The display apparatus of claim 2, wherein the driving circuit substrate includes a ground part electrically connected to the ground wiring through the flexible film, and grounded to the case of the backlight assembly.

4. The display apparatus of claim 3, wherein the ground part is electrically connected to the backlight assembly through a ground pin passing through the driving circuit substrate.

5. The display apparatus of claim 3, further comprising:
   a cover part configured to cover the driving circuit substrate,
   wherein the cover part comprises a bottom portion disposed in parallel with the display panel, a step portion forming a step with the bottom portion and coupled with the backlight assembly, and a sidewall substantially perpendicular to the bottom portion, and
   the driving circuit substrate is disposed between the backlight assembly and the cover part.

6. The display apparatus of claim 5, wherein the sidewall is spaced apart from the second substrate in a third direction, the third direction substantially perpendicular to the first and second directions.

7. The display apparatus of claim 1, further comprising:
   a liquid crystal layer disposed between the second substrate and the first substrate; and
   a sealing member disposed between the second substrate and the first substrate to seal the liquid crystal layer,
   wherein the ground connecting part contacts the sealing member.

8. The display apparatus of claim 1, wherein the first side sealing layer comprises conductive particles and a polymeric material including a black pigment.

9. The display apparatus of claim 8, further comprising:
   a second side sealing layer disposed on the first side surface, the second side surface and the third side surface of the second substrate,
   wherein the second side sealing layer covers the first side surface, the second side surface and the third side surface of the second substrate.

10. The display apparatus of claim 9, wherein the second side sealing layer comprises an insulation material.

11. The display apparatus of claim 1, wherein the ground connecting part is a silver (Ag) dot.

12. The display apparatus of claim 11, further comprising a ground connecting layer disposed on a side surface of the first substrate and connected to the ground connecting part.

13. The display apparatus of claim 12, wherein the ground connection layer comprises substantially the same material as the ground connecting part.

14. The display apparatus of claim 11, wherein the second substrate comprises an upper base substrate and a metal pattern disposed on the upper base substrate, and the metal pattern comprises the ground wiring.

15. The display apparatus of claim 1, wherein the first substrate comprises a lower base substrate and a transparent conductive layer disposed between the lower base substrate and the backlight assembly; and
the transparent conductive layer is electrically connected to the ground connecting part.

16. The display apparatus of claim 1, wherein a portion of the second substrate is not covered by the first substrate, and
the flexible film is connected to the exposed portion of the second substrate.

17. The display apparatus of claim 1, wherein the first side sealing layer includes a conductive material on the fourth side surface of the second substrate.

18. The display apparatus of claim 1, wherein the first side sealing layer comprises a sealing layer comprising an insulation material and a conductive layer contacting the sealing layer.

19. The display apparatus of claim 1, wherein the second substrate further comprises a signal wiring electrically connected to the thin film transistor,
the flexible film comprises a first connecting terminal and a second connecting terminal,
the ground wiring is electrically connected to the first connecting terminal, and the second connecting terminal is electrically connected to the signal wiring.

20. A display apparatus, comprising:
a display panel comprising a display area and a non-display area, a lower substrate, an upper substrate disposed opposite the lower substrate, a thin film transistor, a ground wiring, and a liquid crystal layer disposed between the lower substrate and the upper substrate;
a side sealing layer directly disposed on a side surface of the upper substrate and being conductive;
a ground connecting part disposed on a lower surface of the upper substrate, and electrically connected to the ground wiring and the side sealing layer;
a backlight assembly disposed under the display panel;
a flexible film electrically connected to the ground wiring; and
a driving chip disposed on the flexible film,
wherein a portion of the ground wiring is disposed in the non-display area and is at least partially covered by the ground connecting part in a plan view, and
wherein a material composition of the side sealing layer is different from a material composition of the ground connecting part.

* * * * *